United States Patent Office 3,224,849
Patented Dec. 21, 1965

3,224,849
PREPARATION OF COAL SLURRIES
Roger M. Dille, La Habra, Calif., Frank E. Guptill, Jr., Fishkill, N.Y., and John C. Ahlborn, Pomona, Calif., assignors to Texaco Inc., New York, N.Y., a corporation of Delaware
No Drawing. Filed Mar. 23, 1962, Ser. No. 182,083
9 Claims. (Cl. 48—206)

The present invention relates to improvements in processes utilizing coal in fine particle form which involve forming a flowable mixture of coal particles in water and then passing the mixture through an elongated tubular heating zone while heating the mixture to vaporize water therefrom and form a dispersion of coal particles in steam. This method of feeding coal particles into a flow type gasifier is described in U.S. Patent 2,864,677. The method is also applicable to pulverization of coal by fluid energy grinding as described in U.S. Patent 2,735,787.

This invention is directed primarily to preventing or reducing the accumulation of scale in tubular heating zones employed in feeding coal to such processes. This beneficial result is accomplished by the following steps:

(a) The addition of ammonium hydroxide to a slurry of fine coal particles in water, (b) Withdrawing water containing ultrafine solid particles from the remaining treated coal particles, and (c) Forming a flowable mixture of the treated coal particles in water substantially free from dissolved solids as feed to the tubular heating zone.

In a specific embodiment, the treatment outlined above is supplemented by injection of additional water substantially free from dissolved solids directly into the tubular heating zone in the region where vaporization of water from the slurry takes place, particularly just ahead of the area where complete vaporization of the water from the slurry takes place in the absence of water injection.

Scale is detrimental in the tubular heater because it causes the passage in the tube to become so constricted as to interfere with normal operation of the heater and associated equipment for feeding the coal slurry to the gasifier. Scale formation in the heating tubes results in reduced heat transfer through the tube walls, overheating of the tubes, and excessive pressures and velocities within the tubes. In addition, the slurry feed pump is subjected to excessive pressures. Unless the system is shut down and the scale removed or the tube replaced, the heating coil can become completely plugged. Particular difficulty has been experienced when treating coal which contains sodium and calcium compounds which are soluble in the water used for the preparation of slurry as feed to the process. Typically, coals contain sulfur compounds, iron compounds, or both, as well as siliceous materials and bicarbonates. Calcium forms insoluble scale in the tubular heaters. Sodium deposits as a soluble scale combined with ultrafine particles of coal which, one heating, becomes insoluble. Silica, and compounds of iron and aluminum may be included in the scale.

It has been proposed heretofore, for example in U.S. Patent 2,924,515, to reduce scale in tubular heaters employing flowable mixtures of coal particles by the addition of alkaline hydroxide, such as ammonium hydroxide or sodium hydroxide, and alkaline carbonate, such as sodium or potassium carbonate, to the coal slurry. Such treatment causes the soluble calcium compounds to be precipitated as insoluble calcium carbonate which is deposited on the solid coal particles. In many cases, the solid particles can be passed through the heater without scale deposition.

In the gasification of coal, however, it has been found that the above-indicated treatment is not sufficient if the coal slurry contains an excessive amount of "slimes." These slimes have been found to comprise ultrafine particles of solid material, particularly particles smaller than 10 microns in average diameter. Particles smaller than 1 micron are especially undesirable and troublesome. It has been found desirable to eliminate, insofar as pratical, these ultrafine particles from the coal slurry.

Inevitably, ultrafine particles, i.e., particles smaller than 10 microns in average diameter, are produced in the pulverization of coal as feed for the process. Also, fine particles of solid material are precipitated when alkaline treating agents are added to the slurry to reduce the hardness of the water. These ultrafine particles tend to cause scale formation in the tubular heater, even though the hardness, as determined by calcium concentration, is reduced substantially to zero by addition of alkaline treating agents.

In accordance with the present invention, removal of ultrafine particles is accomplished by the steps previously outlined above and described in more detail in the specific examples which appear hereinafter. Particles smaller than 10 microns are reduced to less than 2 weight percent and particles smaller than 1 micron are substantially completely eliminated from the coal slurry.

The coal feed for the flow type gasification processes suitably is prepared by wet grinding in a ball mill. Prior to grinding, the coal preferably is washed with soft water, e.g. water containing less than 600 p.p.m. (parts per million by weight) of total dissolved solids to remove soluble salts from the coal. The grinding equipment, e.g. ball mill and classifier, is adjusted to produce a product finer than 20 mesh but with not more than 10 to 15 percent finer than 325 mesh, Tyler Standard Screen Scale. Particles larger than 20 mesh are undesirable and are recycled to the grinder. Particles larger than 20 mesh in a coal in water slurry tend to interfere with the proper operation of the check valves in the slurry feed pump. Desirably, from 8 to 12 percent of the coal particles are within the size range of 20 to 40 mesh to produce a scouring effect in the heating coil.

After the coal is ground and sized, it is mixed with water to form a flowable mixture containing from 45 to 60 percent coal by weight as feed to the tubular heater associated with the flow type gasifier. In the process of this invention, more water is added to the pulverized coal than is required in the feed mixture supplied to the gasifier. Desirably this water contains not more than 200 p.p.m. total dissolved solids. However, ordinary soft water containing not over 600 p.p.m. total dissolved solids can be used. It has been found desirable to make up a thin slurry containing not more than 30 weight percent coal, to which ammonium hydroxide is added. Ammonium hydroxide can be added as aqua ammonia, suitably the commercially available grade containing 30 percent ammonium hydroxide by weight, or ammonia can be added directly to the coal-water slurry forming ammonium hydroxide in situ. In expressing the quantity of ammonium hydroxide added to the coal-water slurry, a 30 weight percent solution of ammonium hydroxide in water, or aqua ammonia, is used as a basis. It is to be understood, however, that equivalent amounts of ammonium hydroxide can be added by other means as already indicated.

We have found it desirable to add 30 weight percent ammonium hydroxide solution to the mixture of pulverized coal and water in an amount equivalent to about 0.1 volume percent of a 20 weight percent coal slurry. The ammonium hydroxide serves a dual purpose. It reduces the hardness of the water and at the same time serves to deflocculate the fine particles or slimes contained in the slurry so that they can be withdrawn by decantation. Following the addition of ammonium hydroxide with suitable agitation, the coal particles are permitted to settle and the supernatant liquid is withdrawn from the settled coal particles. The decantation serves to scalp off particles smaller than 10 microns with the excess water. Water containing dispersed fine particles is removed in this manner until the concentration of coal in the residual liquid is in excess of about 60 weight percent. The concentration limit is reached at about 70 weight percent coal. There is no particular advantage in filtering off the remaining water. Water substantially free from dissolved solids, suitably condensate, is added to the resulting settled coal slurry to produce a flowable mixture, preferably containing from 45 to 50 weight percent coal.

The distribution of particle sizes and the quantities of the fine particles in the slurry can be determined by sedimentation. It is desirable that the final slurry contain not more than 2 weight percent particles smaller than 10 microns. The hardness, determined as $CaCO_3$ should be not more than 10 parts per million and the content of total dissolved solids preferably is less than 200 p.p.m. If an analysis shows that the quantity of fine particles smaller than 10 microns is excessive following treatment with ammonium hydroxide and decantation, the treating process may be repeated using water substantially free from dissolved solids, and ammonium hydroxide to disperse the fine particles following which they are withdrawn from the coarser particles by decantation. The concentration of the slurry is finally adjusted to the desired value to form a flowable mixture as feed to the tubular preheater. It has been found that a flowable mixture containing from 45 to 50 percent coal by weight, preferably 46 to 48 percent is especially suitable as feed to the tubular heating coil of the coal-fired flow type gas generator.

Calcium is precipitated as calcium carbonate. If necessary, ammonium carbonate can be used for this purpose. The pH can be adjusted to about 9 to give a hardness of not more than about 10 parts per million.

The treatment described above substantially eliminates the formation of scale in the heater tubes. Over a long period of time, some scale accumulations may occur in the heater tubes. These can be removed without shutting down the heater or interrupting the supply of fuel to the coal processing apparatus by "rocking the dry point" in the heater. As the coal-water slurry passes through the tubular heater, the slurry is first preheated and then water is vaporized from the slurry to form a dispersion of coal particles carried along through the heater in a stream of steam. At some point along the path of flow of the coal particles through the heater, the last of the water contained in the slurry is vaporized. This point in the heater will be designated herein as the dry point. In other words, the dry point is that point in the heater along the path of flow of the coal through the heater beyond which no liquid water exists. During the course of normal operation with constant conditions of temperature, pressure, feed rates, etc., the dry point will move along the tubular heater toward the outlet. This movement of the dry point results from the accumulation of scale on the inner walls of the tubular heater which reduces the rate of heat transfer through the heater tube to the slurry. The dry point may be caused to shift to another section of the heater by changing one of the variables, such as temperature, flow rate, pressure or the like. When the dry point is caused to move upstream relative to the movement of the coal through the heater, the scouring action of the coal particles in the dispersion of coal in steam removes the scale from the tube. Scale can also be removed from the inner surface of the heater tube to a greater or lesser extent by solution in water substantially free from dissolved solids. In accordance with our invention scale is removed from the heater tubes by the following steps used either singly or in combination:

(a) Periodically injecting coal slurry into the tubular heater ahead of the dry point to redissolve scale deposits, followed by operation without said injection, (b) Periodically injecting water substantially free from dissolved solids into the tubular heater ahead of the dry point to redissolve scale deposits, followed by operation without supplemental water injection, (c) Periodically increasing the rate of introduction of slurry feed to the tubular heater to force the dry point farther downstream in the heater and permit scale deposits to redissolve in slurry, followed by decreasing the rate of feed supply to permit the dry point to return to or near its original position, and/or (d) Periodically decreasing the rate of heat input to the tubular heater to permit the dry point to move farther downstream in the heater and permit slurry to contact and dissolve shale deposits, followed by increasing the heat input to the heater to cause the dry point to return to or near its original position.

*Example 1*

Itsudan coal (Itsudan, Japan) was gasified in a flow type gasifier. This coal had the following ultimate analysis:

| | Weight percent |
|---|---|
| Carbon | 64.32 |
| Hydrogen | 4.92 |
| Oxygen | 14.97 |
| Nitrogen | 0.87 |
| Sulfur | 1.78 |
| Ash | 13.14 |
| | 100.00 |

The coal was wet ground in a ball mill and the resulting thick slurry of ground coal and water was discharged from the ball mill to a classifier which captured the particles coarser than 20 mesh, Tyler Standard Screen Scale and returned them to the ball mill for further grinding. The heavy slurry product from the ball mill was then directed to a slurry storage tank 12 feet in diameter and 8 feet high. Sufficient water free from dissolved solids was added to the thick slurry from the ball mill to produce a feed slurry for the gasifier containing 49.9 weight percent coal. To this slurry was added 1 volume percent of a 30 weight percent solution of ammonium hydroxide and 0.5 pound of ammonium carbonate per ton of slurry. The slurry was thoroughly stirred to insure uniform reaction of the chemicals. The chemical treatment reduced the hardness of the water in the slurry to 13 parts per million, calculated as calcium carbonate. The total dissolved solids content of the water in the slurry was 2000 parts per million. Analysis of the coal content of the slurry showed that it contained 1.8 weight percent particles in the range of 20 to 40 mesh and 11 weight percent of particles smaller than 10 microns.

This slurry was pumped at the rate of 2,153 gallons per hour to a heater in which the water was vaporized to steam to form a dispersion of coal in steam as feed for the gasifier. The heater comprised a preheater section consisting of 4 tubes in series heated on their external surfaces with 150 p.s.i.g. steam and a heater section containing 15 similar tubes in series externally heated with 1500 p.s.i.g. steam. All of the water was vaporized in the heater section producing a dispersion of solid coal particles in steam. At the start of the operation, the dispersion of coal in steam which was produced in the heater had about 80° F. of superheat by the time it had reached the 12th tube in the section of the heater heated with 1500 p.s.i.g. steam. After 11 hours of operation the superheat of the dispersion at this point had declined to 0° F. The superheat in the 12th tube declined at the rate of 7.3° F. per hour. When the run was concluded at the end of 17 hours of operation, scaling had taken place in the heater to such an extent that all of the 15 tubes of the heater section were required to vaporize the water content of the slurry so that there was no superheat at the outlet of the 15th tube. At this time, it was necessary to discontinue the operation of the gasifier as a satisfactory dispersion of coal in steam as feed for the gasifier could no longer be produced in the heater.

The dry point in the heater, i.e. the point at which liquid water no longer exists in the heater, progressively moved from the outlet of the 6th tube of the 1500 p.s.i.g steam heated tubes to the 12th tube in 11 hours, and, to the outlet of the 15th tube after 17 hours of operation.

*Example II*

Itsudan coal of substantially the same ultimate analysis as shown in Example I was wet ground in a ball mill and the resulting thick slurry of ground coal and water discharged from the ball mill to a classifier where the particles coarses than 20 mesh were rejected and recycled. The resulting slurry was directed to a 12 foot by 8 foot slurry storage tank. The slurry was diluted in the storage tank with soft water to reduce the solids concentration to about 30 weight percent.

To this slurry was added 0.1 volume percent of a 30 weight percent solution of ammonium hydroxide. The slurry was thoroughly stirred and then allowed to settle. The supernatant liquid, containing very fine coal particles maintained in dispersed condition by the ammonium hydroxide, was decanted from the settler and discarded. After decanting, the solids concentration in the slurry remaining in the storage vessel was about 70 percent by weight. Water free from dissolved solids was then added to the concentrated slurry to dilute it to a solids concentration of about 30 percent by weight. The slurry was again stirred, allowed to settle, and the supernatant liquid discarded until the solids concentration of the remaining slurry had again reached about 70 weight percent. The same procedure of diluting, stirring, settling, and decanting, was then repeated a second time. Following this decanting, distilled water was added in sufficient amount to produce a slurry containing 46.9 weight percent coal. Analysis of the coal content of the final slurry showed it to contain 11.6 percent by weight of particles larger than 40 mesh, and 2.4 weight percent of particles smaller than 10 microns. The water in the final slurry had a hardness of 14 parts per million, calculated as calcium carbonate, and the total dissolved solids content was 580 parts per million.

This slurry was pumped at the rate of 1,882 gallons per hour through an indirect-fired slurry heater. This heater comprised a preheater section consisting of four tubes in series which were heated on their external surfaces with 150 p.s.i.g. steam, and a heater section containing 15 similar tubes in series, externally heated with 1,500 p.s.i.g. steam as in Example I. All of the water was vaporized in the heater, producing a dispersion of solid coal particles in superheated steam at the outlet of the heater section. At the start of the heating operation, the dispersion of coal in steam which was produced by this heating had about 90° F. of superheat by the time it had reached the twelfth tube in the heater, counting from the inlet of the heater section. After 27 hours of operation this superheat had declined only to 75° F. at the twelfth tube, indicating that practically no scaling of the heater tubes had occurred. The drop in superheat temperture at the twelfth tube amounted to only 0.56° F. per hour, as contrasted with a drop of 7.3° F. per hour under the conditions of Example I.

The above examples illustrate the effectiveness of our method of treating coal to prevent the formation of scale in heaters employed for vaporization of water slurries of ground coal. The method of this invention also effects a considerable savings in chemical treatment as indicated in the examples.

We claim:

1. In a process for treating coal particles which tend to form scale in a tubular heating zone in which a flowable mixture of particles of coal in water are passed into and through said heating zone and said mixture is heated during passage through said heating zone to vaporize water therefrom and form a flowing dispersion of coal particles in steam, the improvement comprising removing ultrafine particles from said coal particles thereby reducing the scale forming tendencies of said mixture which comprises the following steps:
   (a) forming a slurry of said coal particles in water comprising not more than 50 percent coal and containing particles smaller than 10 microns,
   (b) adding ammonium hydroxide to said slurry in an amount equivalent to 0.05 to 0.2 volume percent of a 30 weight percent aqueous ammonium hydroxide solution based on the volume of said slurry effecting deflocculation of fine particles of solid material, and
   (c) withdrawing water containing precipitated solids and coal particles smaller than 10 microns from remaining coal particles.

2. A process according to claim 1 wherein said excess water containing particles smaller than 10 microns of step (c) is withdrawn by decanting.

3. A process according to claim 1 wherein said coal particles are smaller than 20 mesh with at least 85 percent falling within the size range of 20 to 325 mesh.

4. A process according to claim 3 wherein from about 8 to about 12 weight percent of said coal particles fall within the size range of 20 to 40 mesh.

5. A process according to claim 1 wherein following step (c), steps (a), (b) and (c) are repeated until no more than 2 weight percent of said coal particles are smaller than 10 microns.

6. A process according to claim 1 wherein the total amount of dissolved solids in the water comprising the flowable mixture supplied to said heating zone is not more than 200 parts per million.

7. In a process for treating coal particles which tend to form scale in a tubular heating zone in which a flowable mixture of particles of coal in water is passed into and through said heating zone and said mixture is heated during passage through said heating zone to vaporize water therefrom and form a flowing dispersion of coal particles in steam, the improvement comprising removing ultrafine particles from said coal particles thereby reducing the scale forming tendencies of said mixture which comprises forming a slurry of coal particles in water containing not more than about 30 percent coal by weight and including particles smaller than 10 microns, adding aqua ammonia to said slurry in an amount equivalent to 0.05 to 0.2 volume percent of a 30 weight percent ammonium hydroxide solution based on the volume of said slurry effecting deflocculation of fine particles of solid material, permitting said slurry to settle by gravity to approximately maximum solid concentration, withdrawing supernatant water containing solid particles smaller than 10 microns from remaining settled solid particles, and adding water substantially free from dissolved solids to said remaining coal particles to form a slurry containing approximately 45 to 50 percent coal by weight to form a flowable mixture of treated coal particles in water as feed to said tubular heating zone.

8. A process according to claim 7 wherein said settled slurry contains about 60 to 70 percent coal by weight.

9. In a process for treating coal particles which tend to form scale in a tubular heating zone in which a flowable mixture of particles of coal in water is passed into and through said heating zone and said mixture is heated during passage through said heating zone to vaporize water therefrom and form a flowable dispersion of coal particles in steam, improvement comprising removing ultrafine particles from said coal particles thereby reducing the scale forming tendencies of said mixture which comprises forming a slurry of fine coal particles in water containg from about 20 to about 30 weight percent coal smaller than 20 mesh containing not more than 15 weight percent of said particles with a size range smaller than 325 mesh including some particles smaller than 10 microns, adding 30 weight percent aqueous ammonia to said slurry in an amount within the range of 0.5 to 0.2 volume percent of said slurry with agitation effecting deflocculation of fine particles of solid material, withdrawing supernatant liquid containing dissolved solids and suspended solid particles smaller than 10 microns from said settled solid particles, until the concentration of coal particles in residual liquid is in excess of 60 weight percent, adding sufficient water substantially free from dissolved solids to said concentrated coal particles to produce a slurry containing from about 20 to about 30 weight percent coal, adding 30 weight percent aqueous ammonia to said slurry in an amount within the range of 0.05 to 0.2 volume percent of said slurry, permitting said slurry to settle, withdrawing supernatant liquid from said slurry to produce a concentrate of treated solid particles containing not more than 2 weight percent smaller than 10 microns, and adding a further amount of water substantially free from dissolved solids to said treated coal particles to form a slurry containing 45 to 50 percent coal by weight as feed to said tubular heating zone.

References Cited by the Examiner
UNITED STATES PATENTS

| | | | |
|---|---|---|---|
| 1,582,300 | 4/1926 | Otis | 210—42 |
| 1,925,222 | 9/1933 | Abendroth. | |
| 2,382,902 | 8/1945 | Pankey et al. | 210—42 X |
| 2,822,787 | 2/1958 | Gauger. | |
| 2,879,750 | 3/1959 | Engel. | |
| 2,924,515 | 2/1960 | Chapman et al. | 48—206 |
| 2,963,355 | 12/1960 | Dille et al. | 48—206 |

MORRIS O. WOLK, *Primary Examiner.*

MAURICE A. BRINDISI, *Examiner.*